United States Patent
Green

(10) Patent No.: US 6,659,491 B2
(45) Date of Patent: Dec. 9, 2003

(54) TRAILER SYSTEM

(76) Inventor: Ralph William Green, 3141 SE. Morningside Blvd., Port St. Lucie, FL (US) 34982

( * ) Notice: Subject to any disclaimer, the term of this patent is extended or adjusted under 35 U.S.C. 154(b) by 0 days.

(21) Appl. No.: 09/778,414

(22) Filed: Feb. 7, 2001

(65) Prior Publication Data

US 2002/0105162 A1 Aug. 8, 2002

Related U.S. Application Data

(60) Provisional application No. 60/258,425, filed on Dec. 27, 2000.

(51) Int. Cl.$^7$ .............................................. B62D 53/08
(52) U.S. Cl. ................. 280/423.1; 280/511; 280/460.1; 280/456.1
(58) Field of Search ............................. 280/423.1, 511, 280/460.1, 456.1, 78

(56) References Cited

U.S. PATENT DOCUMENTS

| 3,482,850 A | 12/1969 | Fay |
| 3,583,137 A | 6/1971 | Lozen |
| 3,784,230 A | 1/1974 | Worrall, Jr. |
| 3,822,798 A | 7/1974 | Neff |
| 3,877,714 A | 4/1975 | Black |
| 3,917,316 A | 11/1975 | Furnish |
| 4,078,821 A | 3/1978 | Kitterman |
| 4,154,451 A | 5/1979 | Young |
| 4,212,093 A | 7/1980 | Lombard |
| 4,305,602 A | * 12/1981 | Ungvari et al. .......... 280/460.1 |
| 4,372,569 A | 2/1983 | Otterson |
| 4,426,097 A | 1/1984 | Livingston |
| 4,438,944 A | 3/1984 | Della-Moretta |
| 4,484,759 A | 11/1984 | Zwick |
| 4,512,593 A | 4/1985 | Ehrhardt |
| 4,645,230 A | 2/1987 | Hammons |
| 4,664,403 A | 5/1987 | Livingston |
| 5,221,100 A | 6/1993 | McNutt |
| 5,397,148 A | 3/1995 | Nelson |
| 5,520,404 A | 5/1996 | Schulte |
| 5,664,796 A | 9/1997 | Huyzers |
| 5,769,449 A | 6/1998 | Keesee |
| 6,042,135 A | 3/2000 | Ross |

* cited by examiner

Primary Examiner—Lesley D. Morris
Assistant Examiner—Matthew Luby
(74) Attorney, Agent, or Firm—Akermann Senterfitt

(57) ABSTRACT

A trailer system is provided in which the trailer system can include a frame having a front end, a rear end, opposing sides between the front end and the rear end and a hitching mechanism coupled to the front end of the frame. The trailer system can also include a wheel assembly coupled to the frame in which the wheel assembly contains at least two wheels and a stabilizing mechanism coupled to the frame and the wheel assembly. The trailer system can also include a plurality of wheel assemblies and stabilizing mechanisms. Further, the frame of the trailer system can have at least one first support member extending from the front end section to said rear end section and at least one second support member extending from said first support member towards one of said side sections. Each stabilizing mechanism can be coupled to the rear end, front end or one of the opposing sides of the frame. In addition, each stabilizing mechanism can be coupled to one of the first or second support members of the frame.

17 Claims, 8 Drawing Sheets

TRAILER SYSTEM

CROSS-REFERENCE TO RELATED APPLICATIONS

This application claims priority from a provisional application No. 60/258,425 filed on Dec. 27, 2000.

BACKGROUND

1. Technical Field

The present invention relates generally to trailers, and more particularly to a system for stabilizing trailers.

2. Description of Related Art

Transporting cargo through the use of a trailer is well known. Generally, such trailers include a longitudinal frame on which a load supporting plate is mounted and a ramp or a plurality of tracks for loading and unloading transported items. In addition, these trailers normally contain a pair of ground-engaging wheels for supporting the trailer. The wheels are usually rotatably mounted to opposite ends of a transverse axle. Moreover, a single hitching mechanism, typically a ball and socket hitch, is permanently attached to the trailer for rigidly coupling the trailer to a towing vehicle. Although suitable in most instances, these trailers can be difficult to maneuver when the towing vehicle is placed in reverse. Further, the rigid connection between the trailer and the towing vehicle can cause damage to the hitching mechanism or instability of the trailer if the trailer is severely jolted by debris, potholes or any other road hazards.

To overcome the maneuverability limitations of conventional trailers, many manufacturers have incorporated a caster wheel assembly into their trailer frame designs. Such a device typically contains a single wheel rotatably centrally coupled to the rear end of the trailer frame. Although it can increase the maneuverability of a trailer, a caster wheel assembly can also lead to greater amounts of stress placed on the hitching mechanism, particularly when the trailer is used on a road with a sharp crown. If the motorist driving the towing vehicle drifts toward the middle of the road, the wheel of the caster wheel assembly can oscillate between different sides of the crown in the middle of the road. This fluctuation can place a wrenching force on the hitching mechanism which can lead to possible structural damage.

In addition to possibly damaging the hitching mechanism, the location of the caster wheel assembly can reduce the versatility of the trailer. Specifically, loading ramps or tracks cannot be placed on the rear of the trailer because the caster wheel assembly is coupled to that section of the trailer. As a result, loading ramps or tracks must be attached to a side of the trailer. This design can render useless many cramped loading areas, such as boat ramps or narrow trails. Thus, what is needed is a trailer system that can handle heavy capacity loads without sacrificing the maneuverability or versatility of the trailer yet can reduce the risk of structural damage to the hitching mechanism.

STATEMENT REGARDING FEDERALLY SPONSORED RESEARCH OR DEVELOPMENT (Not applicable)

SUMMARY OF THE INVENTION

The present invention relates to a trailer system. The system includes a frame having a front end, a rear end and opposing sides between the front end and the rear end. The system also has a hitching mechanism coupled to the frame and at least one wheel assembly, such as a caster wheel assembly, coupled to the frame. Each wheel assembly can have at least two wheels. The system can also have at least one stabilizing mechanism coupled to the frame and each wheel assembly.

In another arrangement, the trailer system includes a frame having a front end, a rear end and opposing sides between the front end and the rear end. The system also has a hitching mechanism coupled to the frame and a plurality of wheel assemblies, such as a caster wheel assembly, coupled to the frame. Each wheel assembly can contain one wheel. The system can also have at least one stabilizing mechanism coupled to the frame and each wheel assembly.

In one arrangement of the above system, the hitching mechanism can be a rotating coupler. In addition, each stabilizing mechanism can include an arm and a receiver for the arm. Further, each stabilizing mechanism can be coupled to the frame and each wheel assembly. Moreover, each stabilizing mechanism can be coupled to the rear end of the frame. In addition, each stabilizing mechanism can be disposed in a separate vertical plane. In another aspect of the invention, the frame can further include a ramp attached to the frame.

In another arrangement, the above trailer system includes a frame having a front end, a rear end, opposing sides between the front end and the rear end. The system also has at least one first support member extending from the front end to the rear end and at least one second support member extending from the first support member towards one of the sides. The system also has a hitching mechanism coupled to the frame and at least one wheel assembly, such as a caster wheel assembly, coupled to the frame. Each wheel assembly can contain at least two wheels. The system can also have at least one stabilizing mechanism coupled to the frame and the wheel assembly.

In another arrangement, the above trailer system includes a frame having a front end, a rear end, opposing sides between the front end and the rear end, at least one first support member extending from the front end to the rear end and at least one second support member extending from the first support member towards one of the sides. The system also has a hitching mechanism coupled to the frame and a plurality of wheel assemblies, such as a caster wheel assembly, coupled to the frame. Each wheel assembly can contain one wheel. The system can also have at least one stabilizing mechanism coupled to the frame and the wheel assembly.

In one arrangement of the above system, the hitching mechanism can be a rotating coupler. In addition, each wheel assembly can be coupled to each second support member. Each stabilizing mechanism can include an arm and a receiver for the arm. Further, each stabilizing mechanism can be coupled to the frame and each wheel assembly. Moreover, each stabilizing mechanism can be coupled to the rear end of the frame, one of the opposing sides, one of the first support members or one of the second support members. In addition, each stabilizing mechanism can be disposed in a separate vertical plane. In another aspect of the invention, the frame can further include a ramp attached to the frame.

DETAILED DESCRIPTION OF THE PREFERRED EMBODIMENTS

Figure 1:
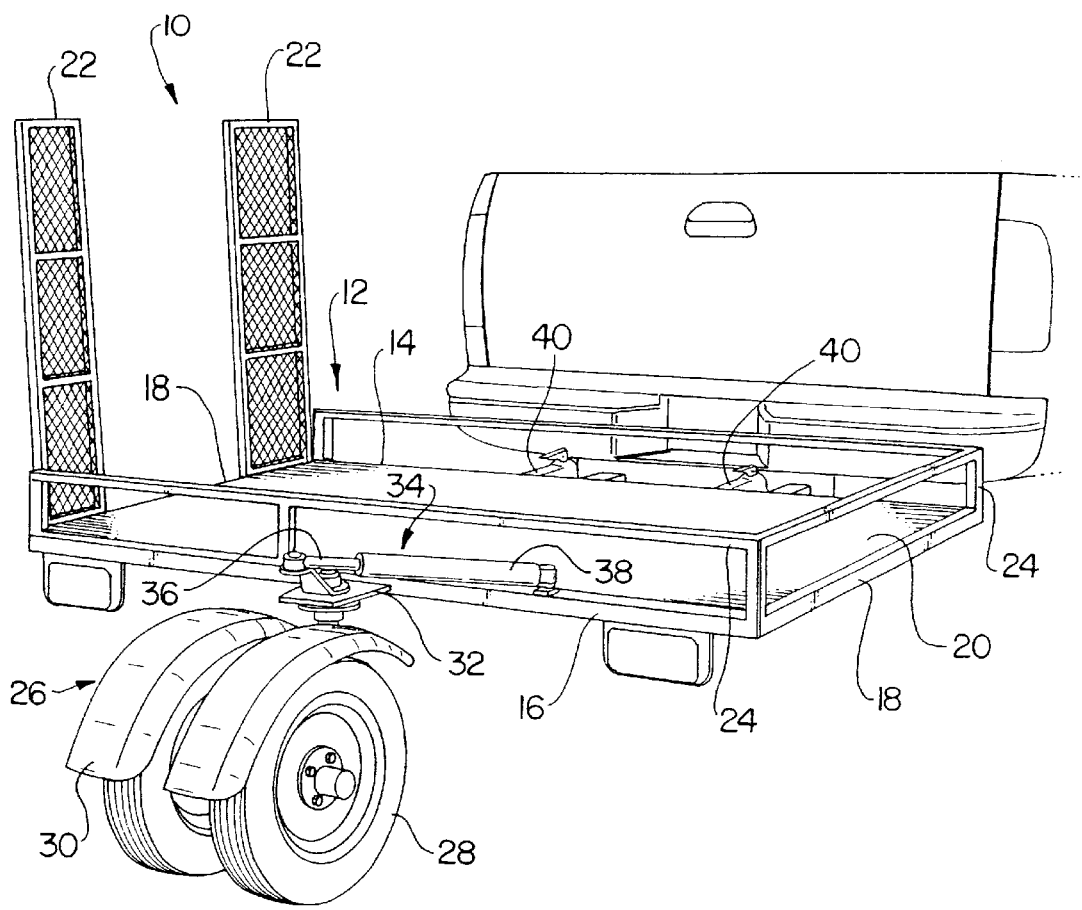
FIG. 1 is a perspective drawing of a trailer system in accordance with the inventive arrangements.

FIG. 1 illustrates a trailer system 10 having a frame 12. The frame 12 can be constructed of any material suitable for supporting relatively heavy loads. Suitable material include metal, plastic or wood. The frame 12 can include a front end 14, a rear end 16 and opposing sides 18 between the front end 14 and the rear end 16. The frame 12 can also include a support plate 20 and a ramp 22. The support plate 20 supports the transported cargo and can include a non-skid surface for improved safety. The ramp 22 can be a single track or, as shown in FIG. 1, a plurality of tracks. Although FIG. 1 shows the ramp 22 attached to one of the opposing sides 18, the invention, as will be explained below, can be accommodated to accept a ramp 22 on the rear end 16. The frame 12 can also include one or more support rails 24 to prevent cargo from sliding off the frame 12.

A wheel assembly 26, such as a caster wheel assembly, can be coupled to the frame 12. In this arrangement, the wheel assembly 26 is free to rotate in any direction if the towing vehicle is traveling at relatively slow speeds. The wheel assembly 26 can include a set of wheels 28, a splash guard 30 for each wheel and a coupling mechanism 32 for rotatably coupling the wheel assembly 26 to the frame 12. While not pictured, the wheels 28 can be coupled to an axle 29, and a connector 31 can rotatably engage the axle 29. Further, the connector 31 can be permanently attached to the coupling mechanism 32. Although FIG. 1 illustrates the wheel assembly 26 as having two wheels 28, the invention is not so limited, as any number of wheels 28 may be used. It should be noted, however, that using more than one wheel 28 produces a more stable, balanced ride, and in the event of a blowout of one of the wheels 28, the trailer system 10 can still operate. Further, a multiple-wheel assembly 26 results in a more evenly distributed load which causes less wear and tear on the wheel assembly 26 components. In addition, such a configuration produces less wheel chatter. Although not pictured, the wheel assembly 26 can include any conventional braking system.

Rotatably coupled to the coupling mechanism 32 of the wheel assembly 26 is a stabilizing mechanism 34. The stabilizing mechanism 34 can reduce wheel chatter, or wheel vibration, as the trailer system 10 is in motion. While FIG. 1 illustrates the trailer system 10 as containing only one stabilizing mechanism 34, it should be noted that more than one stabilizing mechanism 34 can be coupled to the coupling mechanism 32 of the wheel assembly 26. Moreover, the stabilizing mechanism 34 can be coupled to any part of the frame 12 and is not limited to the configuration illustrated in FIG. 1. If more than one stabilizing mechanism 34 is coupled to the coupling mechanism 32, the stabilizing mechanism 34 can be disposed in separate vertical planes. This permits use of multiple mechanisms 34 without increasing the spatial dimensions of the frame 12. The stabilizing mechanism 34 can include an arm 36 and a receiver 38 for the arm 36. The receiver 38 can be any type of conventional hydraulic piston and can contain hydraulic fluid to resist movement of the arm 36. Limiting the movement of the arm 36 can significantly reduce the movement of the wheel assembly 26 as the towing vehicle increases its speed. This process can eliminate wheel chatter and can improve the smoothness and the safety of the ride as the trailer system 10 is towed.

The frame 12 can also include a hitching mechanism 40 for detachably coupling the frame 12 to a towing vehicle. The hitching mechanism 40 can be permanently attached or detachably coupled to the frame 12. The hitching mechanism can be a ball and socket type hitch or any other hitch suitable for coupling the frame 12 to the towing vehicle. Although FIG. 1 shows the frame 12 as having two hitching mechanisms 40, the invention is not limited to this configuration, as the trailer system 10 can include any number of hitching mechanisms.

Figure 2:
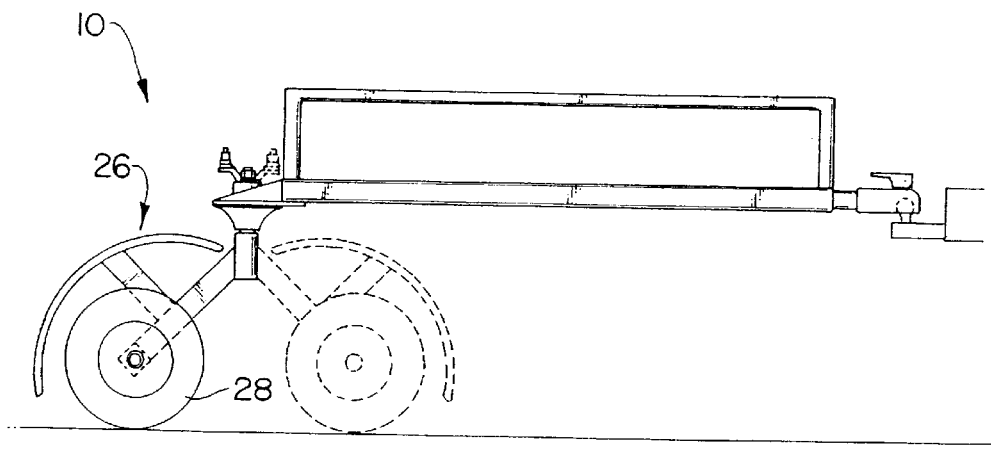
FIG. 2 is a side view of the trailer system of FIG. 1.
Figure 3:
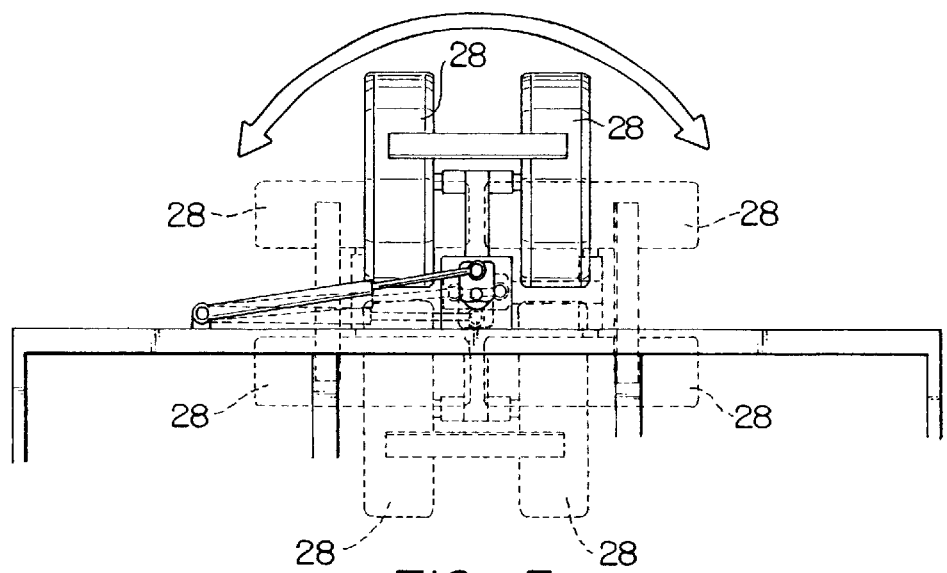
FIG. 3 illustrates the motion of a wheel assembly of the trailer system in accordance with the inventive arrangements.

FIG. 2 illustrates the operation of the trailer system 10. If the towing vehicle is driven in a forward direction, then the wheel assembly 26 can move into a position in which the wheels 28 extend beyond the cover of the frame 12 or away from the rear end 16 of the frame 12. Conversely, if the towing vehicle is placed in reverse, then the wheel assembly 26 can move into a position in which the wheels 28 move towards the front end 14 of the frame 12. In either direction, the stabilizing mechanism 34 can work to reduce wheel chatter. At slower speeds, the wheel assembly 26 can be free to rotate in any direction. FIG. 3 illustrates this process in greater detail.

As shown in FIG. 3, the wheels 28 that comprise this particular wheel assembly 26 can be in any turning position, even a position in which the wheels 28 are parallel with the rear end 16. In addition, the number of wheels 28 that comprise the assembly 26 does not affect the rotation of the wheel assembly 26. Further, the stabilizing mechanism 34 does not inhibit this turning action. Accordingly, maneuverability is greatly increased and the driver of the towing vehicle is permitted to negotiate sharp turns in either forward or reverse.

Figure 4:
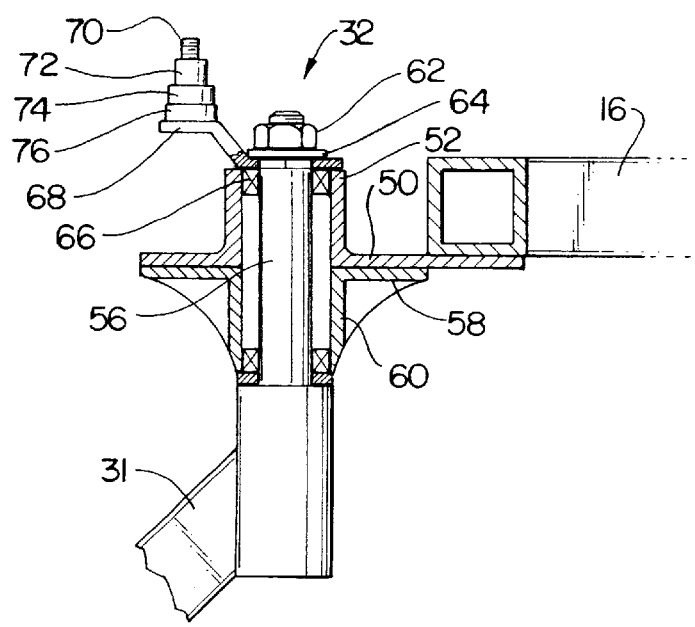
FIG. 4 illustrates a coupling mechanism of a wheel assembly in accordance with the inventive arrangements.

FIG. 4 illustrates in detail the coupling mechanism 32 of the wheel assembly 26. A first plate 50 can be attached to the rear end 16 of the frame 12. The first plate 50 can be welded to the rear end 16, attached by a bolting mechanism or attached to the rear end 16 by any other suitable attaching structure or process. The first plate 50 can contain a first cylinder 52 and an aperture 54 in the first cylinder 52 for receiving a freely rotatable vertical shaft 56. Additionally, the first plate 50 can be attached to a second plate 58 that can contain a second cylinder 60. The vertical shaft 56 can be disposed inside both the first cylinder 52 and the second cylinder 60. In one arrangement, the vertical shaft 56 can be threaded at one end thereby permitting the shaft 56 to engage a first nut 62. Alternatively, the vertical shaft 56 can be non-threaded and the first nut 62 can be held in place by a suitable engaging device such as a cotter pin. Further, a first washer 64 can be disposed on the shaft 56 between the first nut 62 and the first cylinder 52, and one or more rings of packing 66 can be placed around the vertical shaft 56.

A Z-plate 68 can rotatably engage the vertical shaft 56 and can be disposed between the first cylinder 52 and the first washer 64. A bolt 70 can be attached to the Z-plate 68 and can be threaded at the top for purposes of engaging a second nut 72. A second washer 74 and a third washer 76 can be disposed on the bolt 70 between the second nut 72 and the Z-plate 68. The arm 36 (not pictured) can rotatably engage the bolt 70 and can be disposed between the second washer 74 and the third washer 76. In addition, the coupling mechanism 32 can be attached to the connector 31, which rotatably engages the axle 29 to which the wheels 28 are coupled.

Figure 5:
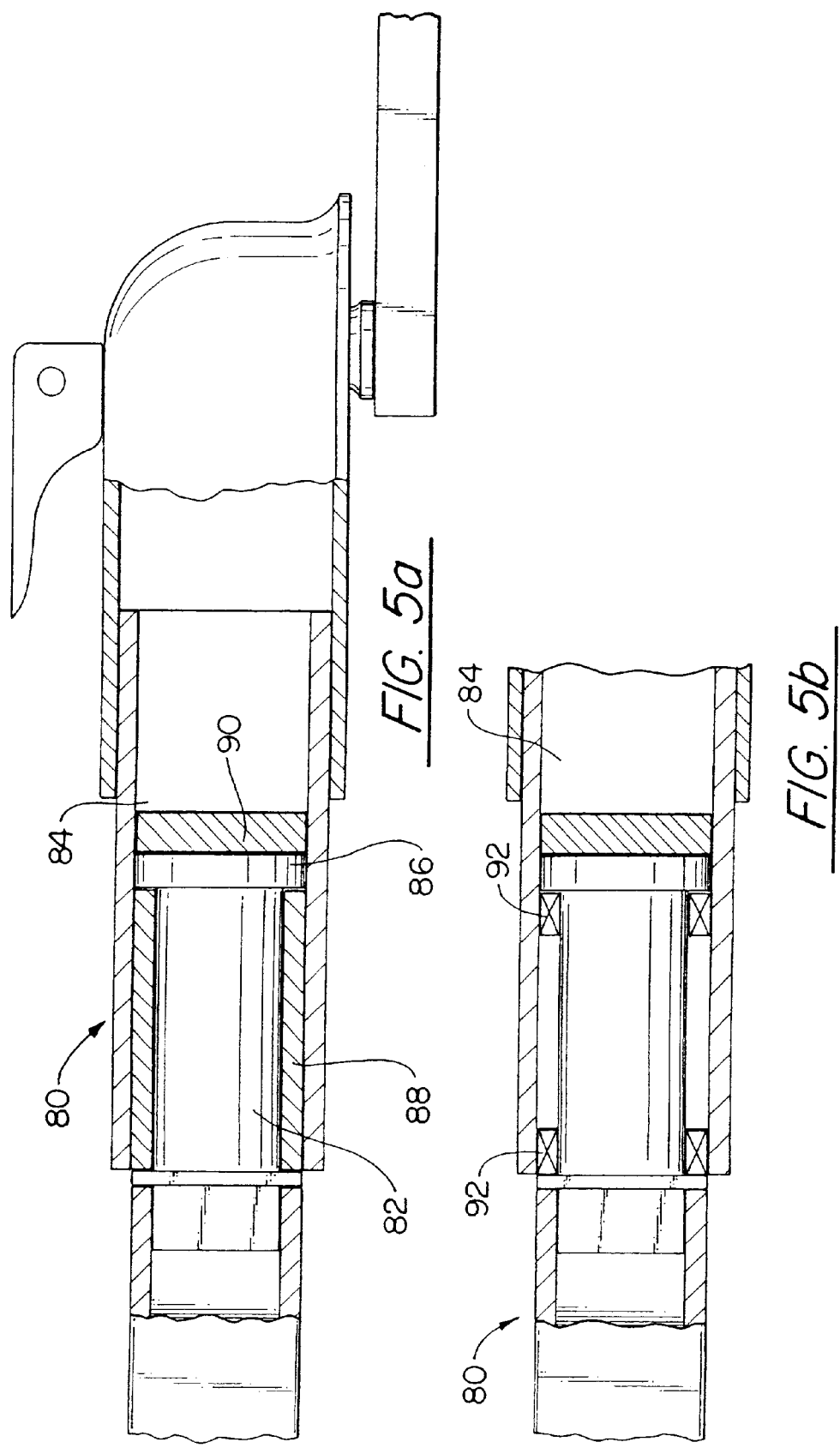
FIG. 5A illustrates a rotating coupler of the trailer system in accordance with the inventive arrangements.
FIG. 5B illustrates an alternative arrangement of the rotating coupler of FIG. 5A in accordance with the inventive arrangements.

FIGS. 5A and 5B illustrate an alternative arrangement of the hitching mechanism 40. Referring to FIG. 5A, a rotating coupler 80 is shown. The rotating coupler 80 has a shaft 82 which can be attached to the frame 12 and disposed in a housing tube 84. A cap 86 with a circumference larger than the circumference of the shaft 82 can be attached to an end of the shaft 82. A securing tube 88 can be wrapped around the shaft 82 and can be disposed between the shaft 82 and the housing tube 84. The securing tube 88 can be welded or bolted to the housing tube 84; however, the invention is not so limited as the securing tube 88 can be attached by any other suitable process or structure. A blocking ring 90 can be attached to the housing tube 84, and in one arrangement, the cap 86 can abut the blocking ring 90. Thus, the translational or lateral movement of the shaft 82 can be restrained by the blocking ring 90 working in combination with the securing tube 88; however, the shaft 82 remains free to rotate in this configuration. This arrangement ensures that the frame 12 is adequately secured to the towing vehicle yet helps prevent damage to the hitching mechanism 40 should the trailer system 10 be jolted or tipped at a significant or even severe angle.

FIG. 5B illustrates an alternative arrangement of the rotating coupler 80 of FIG. 5A. In this arrangement, the overall structure and operation of this rotating coupler 80 is similar to the coupler 80 as described in FIG. 5A; however, the securing tube 88 can be replaced by one or more securing rings 92. The use of one or more securing rings 92 can lower the amount of material required to construct the rotating coupler 80, thereby lowering costs. These securing rings 92 can be attached to the housing tube 84 in a fashion similar to that of the securing tube 88 and housing tube 84 attachment discussed in FIG. 5A.

Figure 6:
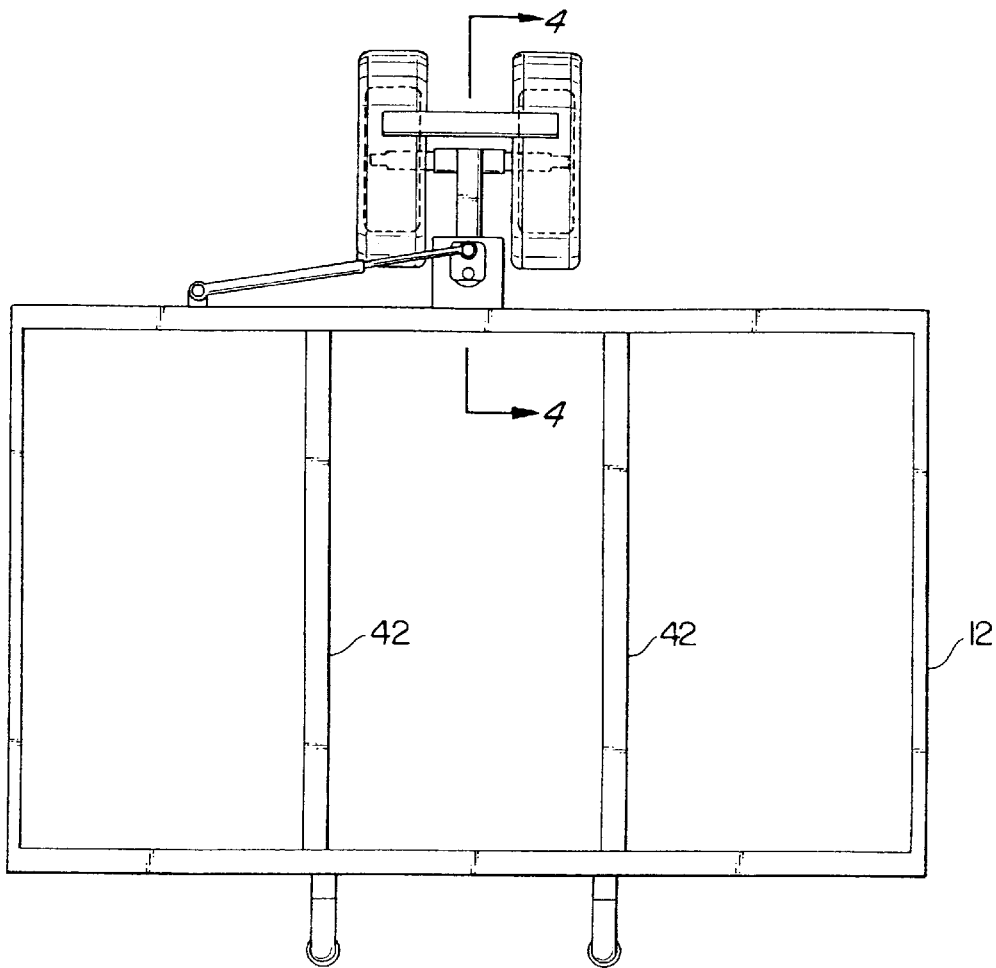
FIG. 6 illustrates a top view of a trailer system in accordance with the inventive arrangements.

FIG. 6 illustrates an alternative arrangement in which the frame 12 can contain one or more first support members 42. These first support members 42 provide extra support for the frame 12 and can be permanently attached to the front end 14 and the rear end 16 of the frame 12. The first support members 42 can be a hollow tube, a solid beam or any other configuration suitable for providing extra support to the frame 12. In addition, the first support members 42 can be constructed of the same material of which the frame 12 is constructed; however, the invention is not limited in this regard, as the first support members 42 can be constructed of any other suitable material.

Figure 7:
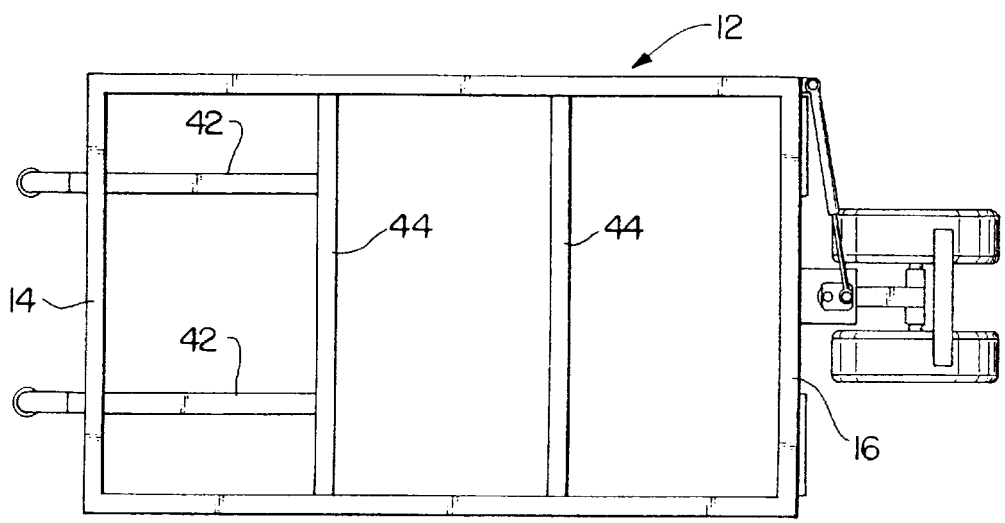
FIG. 7 illustrates an alternative arrangement of the trailer system in accordance with the inventive arrangements.

FIG. 7 illustrates yet another arrangement in which the frame 12 can include one or more first support members 42 and one or more second support members 44. The second support members 44 can be permanently attached to both opposing sides 18 and can provide extra support for the frame 12. Similar to the first support members 42, the second support members 44 can be a hollow tube, a solid beam or any other configuration suitable for providing extra support to the frame 12. Also, the second support members 44 can be constructed of the same material of which the frame 12 is constructed; however, the invention is not limited in this regard, as the second support members 44 can be constructed of any other suitable material.

Continuing with FIG. 7, the first support members 42 can be permanently attached to one of the second support members 44 and the front end 14 of the frame 12. It should be noted, however, that this is merely one of numerous configurations in which the first support members 42 and the second support members 44 can be placed. For example, the first support members 42 can be attached to any number of second support members 44. In addition, the first support members 42 can be attached to the front end 14 or the rear end 16 of the frame or simply can be attached to the second support members 44.

Figure 8:
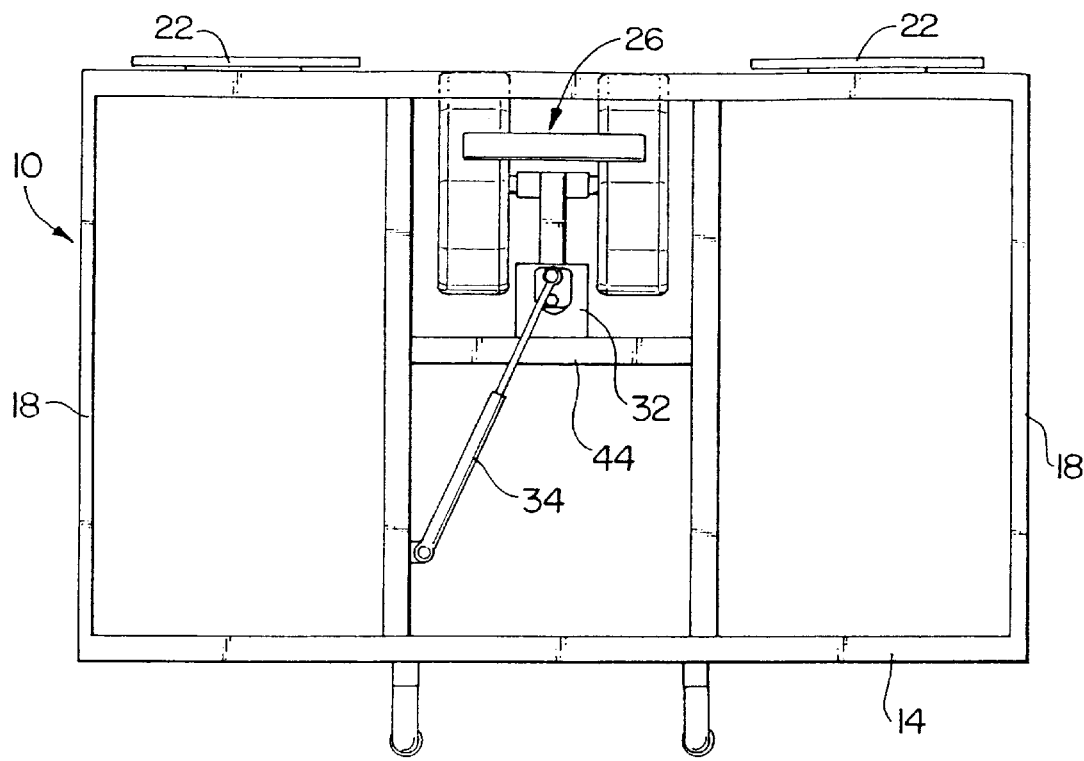
FIG. 8 illustrates a trailer system with a wheel assembly located under the frame in accordance with the inventive arrangements.

FIG. 8 shows an alternative arrangement of the present invention in which the coupling mechanism 32 of the wheel assembly 26 is attached to a second support member 44. In this arrangement, the stabilizing mechanism 34 can be coupled to one of the first support members 42. The stabilizing mechanism 34, however, can also be coupled to one of the opposing sides 18, one of the second support members 44 or the front end 14 of the frame 12. Placing the wheel assembly 26 under the frame 12 allows the ramp 22 to be attached to the rear end 16 of the frame 12. This arrangement permits cargo to be unloaded in cramped loading areas.

Figure 9:
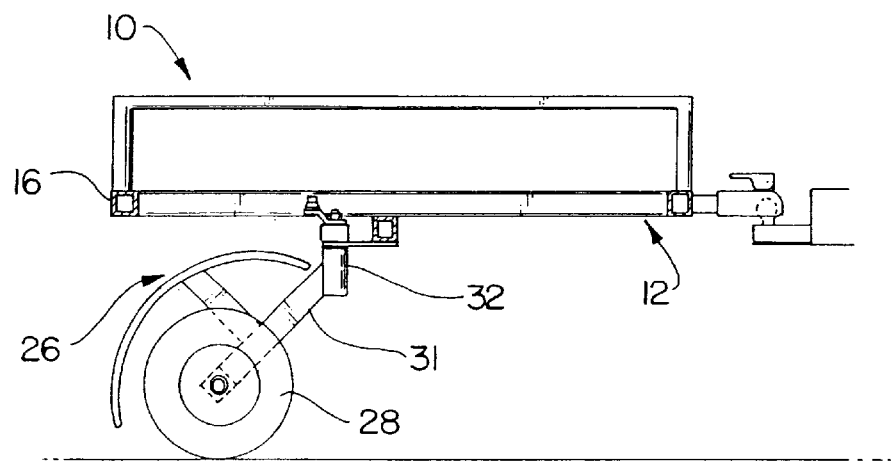
FIG. 9. is a side view of the trailer system of FIG. 8.

Although attaching the coupling mechanism of the wheel assembly 26 results in the wheel assembly 26 being closer to the towing vehicle, such an arrangement can be configured to not negatively affect the balance of the trailer system 10. As shown in FIG. 9, the wheels 28 of the wheel assembly 26 remain located near the rear end 16 of the frame 12 due to the angle of attachment between the connector 31 and the coupling mechanism 32. Such a configuration adequately supports the trailer system 10.

Figure 10:
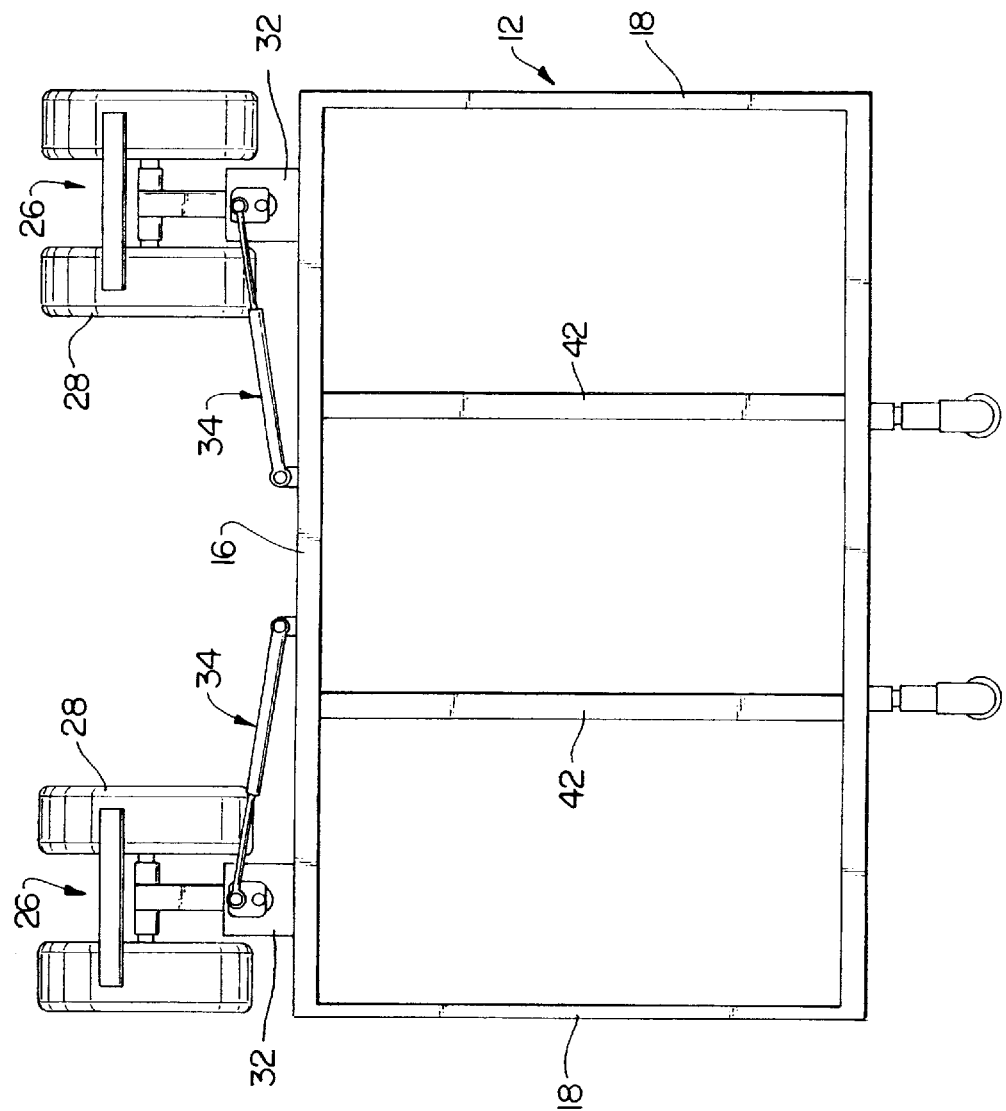
FIG. 10 illustrates a trailer system containing multiple wheel assemblies in accordance with the inventive arrangements.

FIG. 10 illustrates an alternative arrangement of the present invention in which more than one wheel assembly 26 can be coupled to the frame 12. Although FIG. 10 shows two wheel assemblies 26 coupled to the frame 12, the invention is not so limited, as any number of wheel assemblies 26 can be used. Further, each of the wheel assemblies 26 in this arrangement can include any number of wheels 28. In this configuration, the wheel assemblies 26 can be coupled to the rear end 16 of the frame 12; however, as will be discussed below, the wheel assemblies 26 can be coupled to other sections of the frame 12. In addition, the stabilizing mechanisms 34 can be coupled to the coupling mechanisms 32 of the wheel assemblies 26 and the frame 12. Although pictured as being coupled to the rear end 16 of the frame 12, the stabilizing mechanisms 34 can be coupled to other sections of the frame 12 such as the front end 14, the opposing sides 18, the first support members 42, the second support members 44 or any other suitable section of the frame 12.

Similar to the previous embodiments discussed, the multiple wheel assembly 26 arrangement can contain a support plate 20, a ramp 22, one or more support rails 24, single or multiple hitching mechanisms 40 and any number of first support members 42 or second support members 44. The hitching mechanisms 40 can be the rotating couplers 80, as discussed in FIGS. 5A and 5B. Moreover, each wheel assembly 26 can be coupled to more than one stabilizing mechanism 34. In addition, if more than one stabilizing mechanism 34 is used, the stabilizing mechanisms 34 can be disposed in separate vertical planes.

A trailer system 10 that employs multiple wheel assemblies 26 can present several advantages. For example, this arrangement can improve load distribution and decrease wheel chatter, and reduce wear on the components of the system 10. Further, in the event of a blowout, the trailer system 10 remains operational, particularly if each wheel assembly 26 contains more than one wheel 28. Additionally, the trailer system 10 can be less susceptible to severe tipping, which can damage the hitching mechanisms 40. Moreover, using multiple wheel assemblies 26, especially if the wheel assemblies 26 are placed at opposite ends of the frame 12, can reduce the possibility of assembly 26 oscillation caused by a crown in the middle of the road on which the trailer system 10 is towed.

Figure 11:
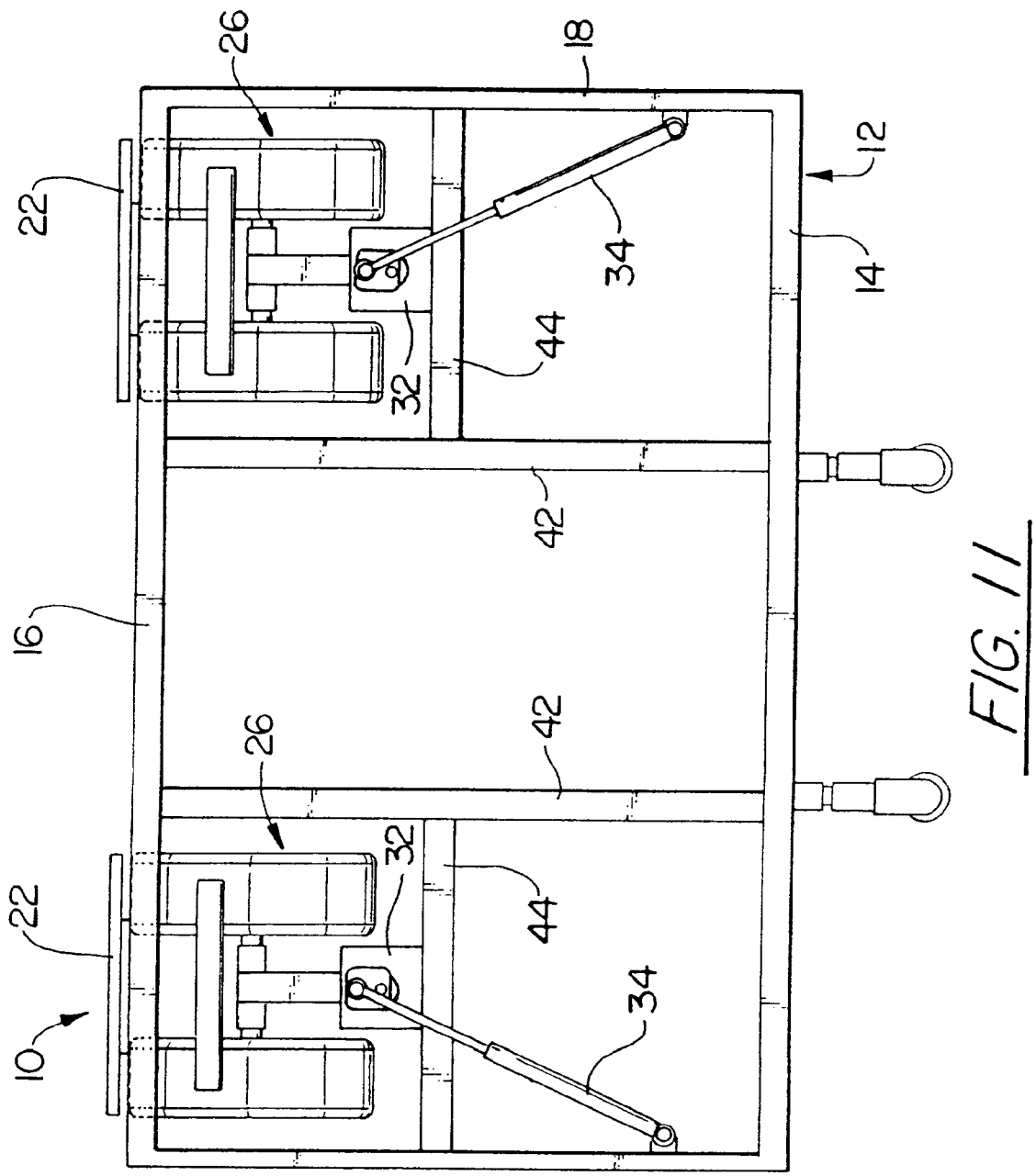
FIG. 11 illustrates a trailer system containing multiple wheel assemblies in which the wheel assemblies are located below the frame in accordance with the inventive arrangements.

FIG. 11 illustrates an alternative embodiment of the trailer system 10 as described in FIG. 10 in which the wheel assemblies 26 are located under the frame 12. In this embodiment, the coupling mechanisms 32 of the wheel assemblies 26 can be attached to one or more second support members 44. It should be noted, however, that the invention is not limited in this regard, as the coupling mechanisms 32 can be attached to one or more first support members 42 or one or more of the opposing sides 18.

As shown in FIG. 11, the stabilizing mechanisms 34 can be coupled to the opposing sides 18. The stabilizing mechanisms 34, however, can also be coupled to one or more first support members 42, one or more second support members 44, the front end 14 or any other suitable section of the frame 12. Similar to the single wheel assembly 26 configuration of FIG. 8, this arrangement allows the ramp 22 to be attached to the rear end 16 of the frame 12 without negatively affecting the overall balance of the trailer system 10.

Figure 12:
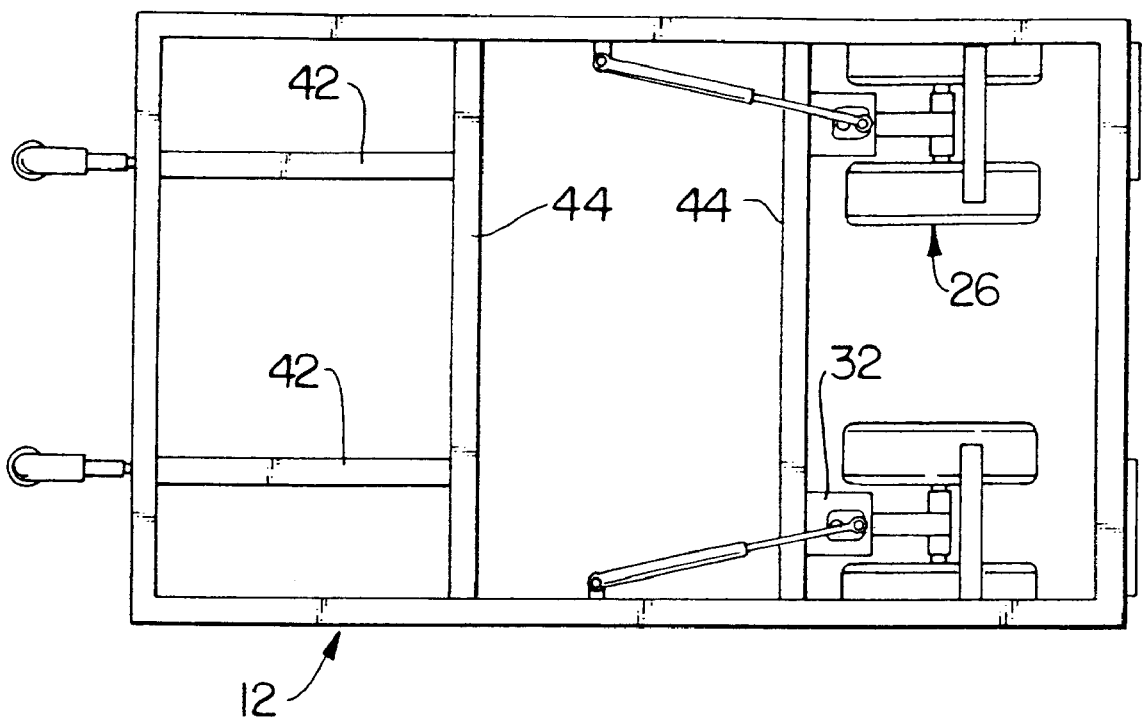
FIG. 12 illustrates an alternative arrangement of the trailer system in accordance with the inventive arrangements.

FIG. 12 shows an alternative arrangement of the invention as presented in FIG. 11 in which the coupling mechanisms 32 of the wheel assemblies 26 can be attached to a single second support member 44. In addition, one or more first support members 42 can be attached to the front end 14 of the frame 12 and one of the second support members 44, including the second support member 44 to which the coupling mechanisms 32 of the wheel assemblies 26 are attached.

It should be understood that the examples and embodiments described herein are for illustrative purposes only and that various modifications or changes in light thereof will be obvious to persons skilled in the art and are to be included within the spirit and purview of this application. Moreover, the invention can take other specific forms without departing from the spirit or essential attributes thereof.

What is claimed is:

1. A trailer system, comprising:
    a hitching mechanism coupled to said frame for hitching the trailer system to a towing vehicle;
    a caster wheel assembly comprising a coupling assembly coupled to said frame, and; and
    a substantially horizontally-acting chatter control mechanism coupled to said frame and said caster wheel assembly,
    wherein said chatter control mechanism includes hydraulic piston, whereby horizontal chatter of the caster wheel assembly is reduced by the chatter control mechanism while the trailer system is towed by the towing vehicle.

2. The trailer system according to claim 1, wherein said hitching mechanism is a rotating coupler.

3. The trailer system according to claim 1, wherein said frame further comprises a ramp attached to said frame.

4. The trailer system according to claim 1, wherein said chatter control mechanism is coupled to said rear end of said frame.

5. The trailer system according to claim 1, wherein said chatter control mechanism is coupled to at least one of said opposing sides of said frame.

6. The trailer system according to claim 1, further comprising a plurality of said chatter control mechanisms, said chatter control mechanisms coupled to said frame and said wheel assembly.

7. The trailer system according to claim 6, wherein each said chatter control mechanism is disposed in a separate vertical plane.

8. The trailer system according to claim 6, wherein each said chatter control mechanism is coupled to said rear end of said frame.

9. The trailer system according to claim 6, wherein each said chatter control mechanism is coupled to at least one of said opposing sides of said frame.

10. The trailer system according to claim 6, wherein at least one said chatter control mechanism is coupled to said rear end of said frame and at least one said chatter control mechanism is coupled to at least one of said opposing sides of said frame.

11. The trailer system according to claim 1, comprising at least two wheel assemblies.

12. The trailer system according to claim 11, wherein each of said wheel assemblies is coupled to one of said chatter control mechanisms.

13. The trailer system according to claim 1, wherein said hitching mechanism is a rotating coupler.

14. The trailer system according to claim 1, wherein said frame further comprises a ramp attachable to said frame.

15. The trailer system according to claim 1, wherein said frame further comprises at least one first support member extending from said front end to said rear end, and at least one second support member extending from said first support member to one of said sides.

16. The trailer system according to claim 15, wherein said chatter control mechanism is coupled to said first support member.

17. The trailer system according to claim 15, wherein said chatter control mechanism is coupled to said second support member.

* * * * *